3,595,942
PARTIALLY HYDROGENATED BLOCK
COPOLYMERS
Milton M. Wald, Walnut Creek, and Myron G. Quam, deceased, late of Hayward, Calif.; said Wald assignor to Shell Oil Company, New York, N.Y.
No Drawing. Continuation-in-part of abandoned application Ser. No. 333,671, Dec. 26, 1963. This application Dec. 24, 1968, Ser. No. 806,763
(Filed under Rule 47(a) and 35 U.S.C. 116)
Int. Cl. C08f 15/04
U.S. Cl. 260—880                4 Claims

ABSTRACT OF THE DISCLOSURE

Block copolymers of monovinyl arenes with conjugated dienes are hydrogenated to form selectively hydrogenated products wherein only the conjugated diene blocks are hydrogenated, the resulting materials having substantial advantages relative to higher melt temperatures and therefore higher service temperatures, excellent resistance to oxidation and reduced creep and set characteristics.

---

This application is a continuation-in-part of copending application Ser. No. 333,671, filed Dec. 26, 1963 now abandoned. This invention relates to a new class of partially hydrogenated block copolymers and to a process for their preparation.

The hydrogenation of ordinary rubbers such as polybutadiene as well as other polymers has been carried out in the past with the primary intent of providing polymeric substances which are more stable with respect to ozone or oxygen. For the most part, the hydrogenation of vulcanizable rubbers such as polybutadiene or polyisoprene results in materials which, while saturated or virtually so, are also seriously degraded with respect to their molecular weight. Since such polymers always require vulcanization in order to attain their maximum physical properties, such molecular weight degradation is not of primary importance.

More recently, specialized classes of block copolymers have been synthesized illustrated by such polymers as those having the structure polystyrene-polyisoprene-polystyrene. Within certain molecular weight limitations and certain proportions of end blocks to center blocks, such polymers are referred to as thermoplastic elastomers in view of the fact that above their softening point they behave like thermoplastic materials and can be processed in ordinary thermoplastic processing equipment. When utilized below their softening points they exhibit the properties normally associated with vulcanized elastomers without having been subjected to vulcanization. The advantages of such polymers are manifested in their ease of processing and their ability to be reprocessed since they have not been vulcanized. Ordinary cured rubbers cannot be reprocessed since upon vulcanization they become highly intractable materials only useful either in their original form or ground up for filler for newly formed rubber compositions.

However, the block copolymers just described suffer seriously from several limitations both with respect to their oxidation sensitivity and particularly with respect to their relatively low service temperatures which are limited by the softening points of the several types of blocks making up the block copolymer. The possibility has existed of either utilizing the polymer without further treatment such as hydrogenation or of completely hydrogenating the entire polymer. The non-hydrogenated block copolymer has the virtue of incompatibility between the several types of polymer blocks making up the basic structure. However, as stated hereinabove, the block copolymer is oxidation sensitive. On the other hand, the complete hydrogenation of the block copolymer results in a highly stable structure but hydrogenation of such end blocks as polystyrene to the corresponding polyvinylcyclohexane blocks and of polyisoprene block to the corresponding ethylene-propylene rubber block results in the two types of hydrogenated blocks being more nearly compatible and therefore exhibit creep or a rubber lacking "nerve."

Another disadvantageous feature of the thermoplastic elastomers is that once chain scission has occurred such as at any point in the conjugated diene center block, the self-vulcanizing feature which is an essential aspect of such materials is suddenly lost. There is no gradual decrease in physical properties such as experienced with diene homopolymers, i.e., polyisoprene, but on the contrary the chain scission of a block copolymer due to any degradative influence is catastrophic with respect to physical properties of the resulting product.

Thus while many catalysts may be available for the hydrogenation of polymers in general and of block copolymers in particular, most of these have exhibited the completely unacceptable feature of causing chain scission and therefore ruining the intended product.

It is an object of the present invention to provide improved block copolymers. It is a particular object of the invention to provide block copolymers showing reduced oxidation sensitivity and increased service temperature. A further object of the invention is to provide a process by which the selective hydrogenation of block copolymers may be effected without any appreciable degradation thereof. Other objects will become apparent during the following detailed description of the invention.

Now, in accordance with the present invention, selectively hydrogenated block copolymers are provided having the general configuration A-(B—A)$_{1-5}$ wherein, prior to hydrogenation, each A is a monovinyl arene polymer block and each B is a conjugated diene polymer block and, subsequent to hydrogenation, no more than about 25% of the blocks A double bonds have been hydrogenated and at least about 90% of the blocks B double bonds have been hydrogenated. Again in accordance with the present invention, a superior process for not only selectively hydrogenating the subject block copolymers, but so doing with virtually no degradation being encountered, comprises hydrogenating the polymer in an inert liquid medium in the presence of a catalyst comprising the reduction product of a cobalt or nickel alkoxide and particularly an acetyl acetonate.

The block copolymers utilized as feed to the hydrogenator have the general configuration A-(B—A)$_{1-5}$ in which each A represents a monovinyl arene polymer block and each B represents a conjugated diene polymer block. When in the following discussion and description any block copolymer is described in which two blocks B are immediately adjacent to each other, e.g. in a polymer such as A—B-(B—A)$_{1-5}$, they are considered as a single polymer block. It is preferred that the block A has an average molecular weight of between 8,000 and 60,000 and any non-adjacent blocks B have an average molecular weight between 50,000 and 300,000. In accordance with the preceding statements, any blocks B adjacent to each other have a total average molecular weight between 50,000 and 300,000.

The blocks A may be prepared from such monomers as styrene, alpha methyl styrene, ring alkylated styrenes and the like as well as mixtures thereof. The blocks B may be prepared from conjugated dienes having from 4–10 carbon atoms and preferably 4–5 carbon atoms per monomer molecule, and specifically include butadiene and isoprene.

It will be understood that copolymers may be employed if so desired in any of the blocks making up the block copolymer as long as the blocks A are essentially non-elastomeric in character and the blocks B are elastomeric in type. Thus, the blocks B may be random copolymers of styrene with butadiene, for example, although essentially homopolymeric somewhat branched conjugated diene blocks B are more desirable. The blocks A may be either homopolymeric polystyrene or may be homopolymeric alpha methyl styrene as well as mixtures thereof. It is desirable when alpha methyl styrene predominates in the blocks A that they be modified to the extent of 10–30 mole percent with a copolymer such as styrene so as to improve the thermal stability of the polymer.

The basic structure contemplated has the general configuration A—B—A. In this case it will be understood that the single block B just represented actually may constitute two separate but adjacent blocks B and thus is represented by a single designation B. The block copolymers may be either linear or branched and may be prepared by known as well as new polymerization procedures. In the so-called sequential process, an initiator such as a lithium alkyl is utilized in polymerizing a first monomer such as styrene, after which a second conjugated diene monomer is injected such as polyisoprene and after its complete polymerization a second portion of a monovinyl arene such as styrene is injected to cause formation of the third polymer block. More preferred are the processes involving coupling procedures since closer control over molecular weight may be so achieved and the possibility also exist for altering the block copolymer configuration to suit particular purposes. In a typical coupling process, a lithium alkyl initiator is utilized for polymerizing styrene or other monovinyl arene after which a conjugated diene is injected to form a two-block copolymer bearing a terminal lithium ion. At this point a coupling agent such as a polyhalohydrocarbon or other polyfunctional coupling agent such as a diester or polyester may be injected to cause coupling of these intermediate block copolymers, thus forming the desired self-vulcanizing thermoplastic elastomer. The use of non-halo coupling agent such as esters or polyvinylbenzene are preferred since halogen residues may adversely affect the hydrogenation catalyst during the later hydrogenation step. The block copolymers are preferably formed in an inert hydrocarbon solvent such as cyclohexane or mixtures thereof with alkanes or alkenes such as isopentanes or isopentenes but preferably saturated or inert to hydrogenation. The polymer cements so formed may then be directly utilized in the sequent hydrogenation step.

The class of catalyst employed in the hydrogenation step is critical in several features of: (a) selective hydrogenation of the conjugated diene blocks to the virtual exclusion of the monovinyl arene polymer blocks; (b) the selective hydrogenation being carried out without any appreciable amount of degradation.

It has been found that all the types of catalysts potentially available for hydrogenation the most highly selective and non-destructive are the cobalt or nickel alkoxides and particularly cobalt or nickel acetyl acetonates reduced with an aluminum alkyl compound. Other suitable alkoxides include, for example, cobalt or nickel butoxides, ethoxides, amyloxides, and isopropoxides. It is preferred that the alkoxide be an acetyl acetonate or mixtures thereof with one of the simple alkoxides of cobalt or nickel or mixtures thereof.

Preparation of the hydrogenation catalyst with unusually high activity is accomplished by reacting the metal alkoxide with an organoaluminum compound of the formula: $R_{3-n}ALH_n$ wherein R is a hydrocarbon group of from 1 to 10 carbon atoms, and $n$ is an integer from 0 to 3 (preferably from 0 to 2) inclusive, R may be an alkyl, aryl, alkaryl, aralkyl, or cycloaliphatic group. Examples of such groups include methyl, ethyl, n-propyl, i-propyl, n-butyl, i-butyl, sec.-butyl, tert.-butyl, pentyl, hexyl, heptyl, octyl, nonyl, decyl, phenyl, benzyl, cumyl, tolyl, cyclopentyl, cyclohexyl, cyclohexenyl, and naphthyl radicals. When R is an alkyl group, lower alkyl radicals (1 to 4 carbon atoms) are preferred (methyl, ethyl, propyl, and butyl). Although $n$ may be an integer from 0 to 2, inclusive, trihydrocarbyl aluminum compounds such as tri-(lower alkyl) aluminum are preferred reducing compounds; in this preferred case $n$ is zero. Tri(hydrocarbyl) aluminum compounds are also preferred because small amounts of halogen tend to poison the metallic hydrogenation catalysts formed according to the present invention.

The ratio of aluminum alkyl compound to nickel or cobalt alkoxide may vary widely since even a partial reduction results in the production of an active hydrogenation catalyst. Molar ratios of aluminum compound to cobalt or nickel alkoxide of between 0.1:1 to 10:1 may be employed but it is preferred to utilize ratios of between about 0.5:1 to 6:1.

The selective hydrogenation is effectively controlled by utilizing relatively low hydrogenation temperatures in the order of 25–175° C., preferably 35–150° C. Reaction times will vary but normally are between 5 minutes and 8 hours, preferably ½ to 4 hours. The concentration of the polymer being hydrogenated in the relative inert solvent is not an essential aspect of the present invention, it being realized by experts that the concentration will depend largely upon the other physical aspects of the process and will be chosen such that the hydrogenation product obtained eventually will be fluid enough that polymer recovery may be readily effective. Hydrogenation is normally conducted in an autoclave at hydrogen pressures below about 5,000 pounds and usually in the order of 250–1,500 pounds per square inch.

In particular accordance with the present invention, it has been found that this special type of block copolymer wherein the conjugated diene portion of the original block polymer is substantially completely hydrogenated while the thermoplastic polymer blocks of monovinyl arenes are virtually untouched in the hydrogenation process results in a number of physical advantages indicating great commerial potential for the substances. It has been found, for example, that they perform as pseudo-solids at temperatures in excess of 200° C. while either the fully hydrogenated or non-hydrogenated counterparts of the same polymer are fluids at temperatures in the order of 175° C. Moreover, due to the saturation of the conjugated diene double bonds by hydrogenation, the polymers have especially high resistance to oxidation and because of this it is possible to utilize processing conditions which would not have been possible with the non-hydrogenated starting material. This is especially important since the polymers have been found to have relatively poor processability at the same temperatures at which the more unstable non-hydrogenated block copolymers could be processed. Consequently, it is possible to increase the processing temperatures and to combine the selectively hydrogenated products with modified materials such as polystyrene, extending oils, pigments, carbon blacks, and resins to achieve compositions especially useful for many industrial purposes.

The following examples illustrate the preparation and properties of these selectively hydrogenated block copolymers.

EXAMPLE I

A block copolymer having the structure polystyrene-polyisoprene-polystyrene and having block molecular weights of 15,000–80,000–15,000 was employed. It was dissolved in cyclohexane to form a 7% solution and a separately prepared catalyst was utilized comprising the reduction product formed by reaction of one mole nickel acetyl acetonate with two moles of aluminum triethyl. After two hours of hydrogenation at 160° C., all of the diene double bonds had been reduced and only 16% of the polystyrene block units had been hydrogenated.

EXAMPLE II

A second preparation was made utilizing a block copolymer having the general structure polystyrene-polyisoprene-polystyrene with block molecular weights of 15,000–70,000–15,000 dissolved in cyclohexane. The catalyst was prepared by pre-reaction of 1 mole nickel acetyl acetonate with 2.3 moles aluminum triisobutyl. The catalyst mixture was warmed at 40° C. for 15 minutes and alcohol was added to the polymer feed solution to prevent formation of gel when the feed was added to the preformed catalyst. Hydrogenation was carried out at 40° C. at 750 pounds pressure, the concentration of the polymer in the solution being 7.3 weight percent and the ratio of isopropyl alcohol to aluminum on a molar basis being 1.8. The following table shows the results obtained with a variety of nickel to polymer ratios. It will be seen from the data contained in the table that essentially complete hydrogenation of the diene center block could be achieved without any reduction of the polystyrene blocks.

| | | Conversion, percent | |
|---|---|---|---|
| $(Ni/SIS)_w$ | Time, mins. | Isoprene block | Styrene block |
| 0.0089 | 5 | 83 | [1] ca. 0 |
| 0.0089 | 20 | 98 | [1] ca. 0 |
| 0.0089 | 160 | 100 | [1] ca. 0 |
| 0.0017 | 5 | 58 | [1] ca. 0 |
| 0.0017 | 20 | 81 | [1] ca. 0 |
| 0.0017 | 160 | 97 | [1] ca. 0 |
| 0.00036 | 5 | 7 | [1] ca. 0 |
| 0.00036 | 20 | 25 | [1] ca. 0 |
| 0.00036 | 160 | 58 | [1] ca. 0 |

[1] Present analytical accuracy approximately 5% (basis total styrene).

The data above show that the catalyst is extremely active. GPC data show no molecular weight degradation. It is indicated from these data that even lower temperatures such as room temperature and atmospheric pressure could in fact be employed for the hydrogenation if desired.

EXAMPLE III

The milling behavior of polymers prepared as described in Example II was investigated. It was found that blending with other components could be facilitated by first banding on a mill polystyrene, and then adding the selectively hydrogenated polymer, extending oil and filler to form a readily handed compound band on the mill at temperatures as low as 160° C. Alternatively, the oil, filler, and polystyrene were added as a slurry to the polymer on the mill. Under these conditions the band could again be formed without much difficulty. Furthermore, it was found that because of the thermal stability improvement caused by saturation of the diene center block, much higher temperatures could be employed in the compounding than could be tolerated with the non-hydrogenated polymer. Thus milling runs at 170° C. and 200° C. could be made with ease without any material degradation of the polymer. One of the striking aspects of the processability of the selectively hydrogenated polymer compared with non-hydrogenated polymer was in an extrusion test which showed that the selectively hydrogenated polymer prepared as described in Example II had an extruder output of about 5 times greater than for the non-hydrogenated compound. The quality of the extrudate was judged to be good.

The original non-hydrogenated block copolymer having the structure polystyrene-polyisoprene-polystyrene showed infinite set. The completely hydrogenated polymer wherein all portions of the polymer were hydrogenated had a final set of 22%. However, the selectively hydrogenated polymer prepared as described in Example II had a final set of only about 9%.

We claim as our invention:

1. A hydrogenated block copolymer having the general configuration $$A-B(B-A)_{1-5}$$

wherein, prior to hydrogenation, each A is a monovinyl arene polymer block and each B is a conjugated diene polymer block, and, subsequent to hydrogenation, 0–25% of the blocks A double bonds have been hydrogenated and at least 90% of the blocks B double bonds have been hydrogenated and wherein the blocks A have an average molecular weight between 8,000 and 60,000, any non-adjacent blocks B have an average molecular weight between 50,000 and 300,000 and any blocks B adjacent to each other have a total average molecular weight between 50,000 and 300,000.

2. A selectively hydrogenated block copolymer according to claim 1 wherein the block copolymer prior to hydrogenation has the general configuration polystyrene-polyisoprene-polystyrene.

3. A selectively hydrogenated block copolymer according to claim 1 wherein the block copolymer prior to hydrogenation has the general configuration poly(alpha methyl styrene)-polyisoprene-poly(alpha methyl styrene).

4. A selectively hydrogenated block copolymer according to claim 1 wherein the copolymer has a non-linear branch configuration.

References Cited

UNITED STATES PATENTS

| | | | |
|---|---|---|---|
| 3,113,986 | 12/1963 | Breslow et al. | 260—683.9 |
| 3,239,478 | 3/1966 | Harlan | 260—880 |
| 3,333,024 | 7/1967 | Haefele et al. | 260—880 |
| 3,431,323 | 3/1969 | Jones | 260—880 |

JAMES A. SEIDLECK, Primary Examiner

U.S. Cl. X.R.

260—96HY, 879